United States Patent [19]
Vanderveen

[11] 3,961,902
[45] June 8, 1976

[54] CARBON BLACK REACTOR

[75] Inventor: John W. Vanderveen, Bartlesville, Okla.

[73] Assignee: Phillips Petroleum Company, Bartlesville, Okla.

[22] Filed: Dec. 4, 1974

[21] Appl. No.: 529,667

Related U.S. Application Data

[62] Division of Ser. No. 313,538, Dec. 8, 1972, Pat. No. 3,865,926.

[52] U.S. Cl.............................. 23/259.5; 23/277 R; 423/456; 423/450
[51] Int. Cl.².......................................... C01B 49/00
[58] Field of Search....................... 23/259.5, 277 R; 423/456, 450

[56] References Cited
UNITED STATES PATENTS

| | | |
|---|---|---|
| 2,292,355 | 8/1943 | Ayers............................. 23/259.5 X |
| 2,656,254 | 10/1953 | Heller................................ 423/456 |
| 3,076,695 | 2/1963 | Claassen, Jr. et al.......... 23/259.5 X |
| 3,251,653 | 5/1966 | Aditya........................... 23/259.5 X |

*Primary Examiner*—James H. Tayman, Jr.

[57] ABSTRACT

A tubular carbon black reactor having means for axial introduction of hydrocarbon feed or oxidant on both ends, means for fuel introduction at approximately the center of the reactor, a plurality of means for tangential introduction of oxidant equally distributed over the entire length of the reactor and carbon black withdrawal means located proximate to the locus of introduction of the hydrocarbon feed at both ends.

5 Claims, 4 Drawing Figures

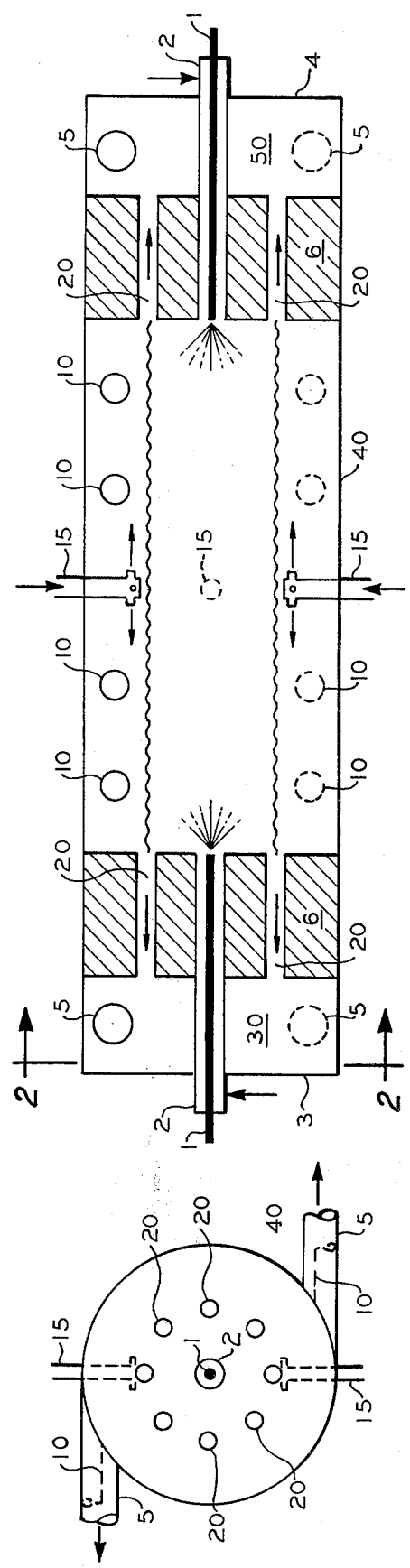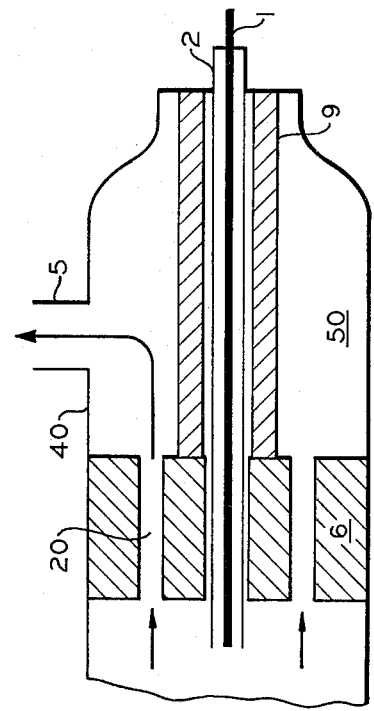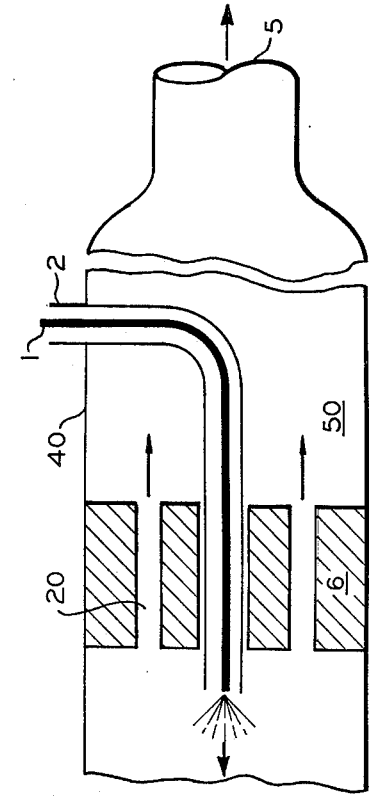

CARBON BLACK REACTOR

This application is a divisional of copending application Ser. No. 313,538, filed Dec. 8, 1972, now U.S. Pat. No. 3,865,926.

This invention relates to a carbon black reactor.

In one of its more specific aspects, this invention relates to the production of furnace-oxidized black.

The production of furnace carbon blacks is well known. Such processes involve introducing a make-oil or hydrocarbon feed into a carbon black reactor and into contact with hot combustion gases produced by the oxidation of a fuel with an oxidant, usually natural gas and air. The contact between the feed and the hot combustion gases raises the feed to its decomposition temperature at which temperature the feed decomposes to produce carbon black which is recovered from the furnace. The present invention involves a method of producing carbon black under the same general principles and conditions, including aspects such as air to fuel ratio, feeds, fuels and oxidants, as are generally employed to produce carbon black as illustrated, for example, in such U.S. patents as U.S. Pat. Nos. 3,410,660 and 3,235,334, the disclosures of which are included herein by reference. The invention also involves apparatus for the production of the black.

The present invention involves two embodiments. In the first, the hydrocarbon feed and air are introduced axially through one end of the reactor and only air, or a vaporous oxidant, is introduced axially through the other end. A vaporous oxidant, preferably air or oxygen-enriched air, is added tangentially through the circumferential periphery of the reactor, being introduced at a plurality of points along the longitudinal axis of the reactor. Fuel, preferably natural gas, is added through the periphery of the reactor at a single locus about mid-point along the length of the reactor. Introduction of the fuel in this manner produces hot combustion gases and oxidant as a cylinder of flame into which the hydrocarbon feed is introduced. The smoke which is produced, and in which the carbon black is contained, is removed and at least a portion of this smoke is passed into contact with the hot combustion gases and vaporous oxidant to oxidize the black and black is then recovered from the reactor proximate the hydrocarbon feed inlet or from both ends of the reactor proximate the locus of introduction of the hydrocarbon feed.

In a second embodiment of the invention, the hydrocarbon feed and vaporous oxidant are introduced axially through both ends of the reactor. The oxidant and fuel are introduced as described in the first embodiment and a portion of the smoke is removed from both ends of the reactor proximate the locus of introduction of the hydrocarbon feed.

As mentioned, the method of the present invention employs hydrocarbon feeds, air to hydrocarbon feed ratios in relation to air to fuel ratios, reaction temperatures and other operating conditions as are employed in the prior art. In the present invention, inasmuch as the carbon black product is passed in a direction opposite to the direction of the hydrocarbon feed introduction and through oxygen-containing gases under conditions to oxidize the black, it is important that these hot combustion gases contain a sufficient quantity of oxygen to effect that oxidation. Generally, air or an oxygen-containing gas is employed in a quantity sufficient to provide from about 1 to about 1.5 times the stoichiometric amount of oxygen required to oxidize the fuel. To produce conventional carbon black of DPG below about 10, the excess air over that needed stoichiometrically for the fuel is between about 300 to 1000 SCF/gallon of feed. To produce oxidized carbon black of DPG greater than about 10, the excess air will be about 1000 to 6000 SCF/gallon of feed.

The invention will be more readily understood if explained in conjunction with the attached drawings in which FIG. 1 is a view of a typical embodiment of the reactor, in elevation;

FIG. 2 is a cross-sectional view through section 2—2 of FIG. 1;

FIG. 3 is one embodiment of the ends of the reactor; and

FIG. 4 is a second embodiment of the ends of the reactor.

Referring now to FIG. 1, there is shown the internal configuration of reactor 40, the insulation thereof being omitted, adapted with hydrocarbon feed inlet conduit 1 and oxidant or air inlet conduit 2 entering the reactor at end 3. The opposite end 4 of the reactor is similarly adapted with make-oil inlet conduit 1 and oxidant or air inlet conduit 2.

In both instances, these inlet conduits penetrate through refractory walls 6 which are preferably formed of refractory material and which have formed through them passages 20, these refractory walls being preferentially positioned in spaced relation to the ends of the reactor to form sections 30 and 50 therebetween. However, walls 6 can be positioned contiguous with the ends of the reactor and sections 30 and 50 can be eliminated. As shown in FIG. 2, passageways 20 can take the form of a plurality of passageways or a single passageway can be constructed in the form of an annulus.

Sections 30 and 50 are adapted with conduit means 5 opening therefrom either radially or tangentially as smoke outlets.

Opening through the wall of the reactor circumferentially at a locus about mid-point between the ends of the reactor along its longitudinal axis are one or more vaporous fuel inlet conduits 15 which can be open at their inner ends or which can be adapted with a plurality of apertures so as to discharge vaporous fuel in a plurality of streams.

Positioned along the longitudinal axis of the reactor and opening thereinto are a plurality of gaseous oxidant, or air inlet means 10 for the introduction of an oxidant into the reactor. These can also be located circumferentially and open through the reactor wall on a common diameter.

As shown in FIG. 2, these air inlet conduits 10 will be adapted for the tangential introduction of the oxidant into the reactor to establish a helically moving layer of oxidant adjacent the inner wall of the reactor.

As shown in FIGS. 3 and 4, various adaptations of the axial hydrocarbon feed inlet conduit means and oxidant inlet conduit means through the end refractory walls, as well as the smoke outlet conduit means, are possible. Inasmuch as the smoke will be at its usual elevated temperature of about 2700°F, it may be desirable to position a cooling jacket 9 in contact with the inlet conduits to maintain them at an operable working temperature, a cooling medium, such as water, being circulated through the jacket through conduit means not shown.

The reactor and process can be operated with hydrocarbon feed introduction into the reactor being made axially into one end or both ends of the reactor.

In that embodiment in which the hydrocarbon feed and air are introduced into but one end of the reactor, air is introduced into the opposite end of the reactor. Fuel, preferably natural gas, is introduced centrally along the longitudinal axis of the reactor with air being introduced through the spaced-apart ports positioned along the longitudinal axis of the reactor.

The fuel gas is ignited and forms hot combustion gases upon oxidation with air. These hot combustion gases are established as a cylinder of flame along the walls of the reactor. The hydrocarbon feed is brought to conventional decomposition temperatures by contact with the hot combustion gases to form carbon black. This carbon black and the hot combustion gases, in the form of smoke, pass from both ends of the reactor to subsequent quenching and recovery facilities.

In another embodiment, hydrocarbon feed and air are introduced in about like amounts into both ends of the reactor and the smoke is removed from both ends of the reactor.

The reactor of this invention can be of any size. One suitable reactor had an internal diameter of 5½ inches, a length of 10 inches between insulation walls 6; the passages 20 through the refractory walls were ¼-inch diameter with eight passages being supplied through each refractory wall. This method of operation established a cylinder of flame having a diameter of about 2⅜ inches.

For reactors of larger capacities, the reactor could have an internal diameter of from about 5½ inches to about 20 inches, a length of from about 8 inches to about 16 inches between refractory walls, from four to 16 passages through the insulation walls, these passageways being from one-fourth-inch to 2 inches in diameter.

The first-described reactor having a 5½ inch diameter was employed using benzene as the hydrocarbon feed under the following conditions to produce carbon black of the quality indicated below, the benzene being introduced into both ends of the reactor in about equal quantities. Rates shown are for each end of the reactor.

| Operating Conditions | For Each End of Reactor |
| --- | --- |
| Benzene Feed Rate, gal./hr. | 0.417 |
| Axial Air, SCF/gal. | 100 |
| Tangential Air, SCF/hr. | 720 |
| Fuel Gas, SCF/hr. (CH$_4$) | 32 |
| Reactor Temperature, °F. | About 2700 |
| Reactor Pressure, inches, water gage | 1 |
| Product Quality | Mixture from Reactor |
| Nitrogen Surface Area, m$^2$/gm | 39 |
| Iodine No., mg/gm | 44 |
| DPG Adsorption, meq/gm | 7 |
| CTAB*, m$^2$/gm | 35 |
| DBP 24M4 Structure**, cc/100 gm | 60 |
| Photelometer | 95 |
| Yield, No. C/gal. benzene | 3.0 |

*Cetyltrimethylammonium bromide
**U.S. 3,548,454, Phillips Petroleum Company (dibutylphthalate)

The black produced above was a comparatively nonoxidized black as indicated by the diphenylguanidine adsorption test value (DPG adsorption, meq/gm). However, the method and apparatus of this invention enable the production of blacks oxidized almost to the extent of 30–50 DPG, such as are produced employing nitric acid after-treatment. This is shown by the following run made at high tangential air rates, hydrocarbon feed and air, only, being introduced into each end of the reactor.

| Operating Conditions | For Each End of Reactor |
| --- | --- |
| Benzene Feed Rate, gal/hr. | 0.15 |
| Axial Air, SCF/gal. | 100 |
| Tangential Air, SCF/hr. | 960 |
| Fuel Gas, SCF/hr. (CH$_4$) | 40 |
| Reactor Temperature, °F | About 2700 |
| Reactor Pressure, psig | 0–1 |
| Product Quality | Mixture from Reactor |
| N$_2$SA, m$^2$/gm | 68 |
| Iodine No., mg/gm | 38 |
| DPG Adsorption, meq/gm | 31.5 |
| CTAB, m$^2$/gm | 62 |
| DBP 24M4 Structure, cc/100 gm | 80 |
| Photelometer | 96 |

While the surface area of the black of the second run was not as low as that of the black of the first run, the lower iodine number indicates the presence of oxygen groups on the black to the extent that the diphenylguanidine test value of 31.5 was within the range of that for blacks which have been after-treated with nitric acid.

This oxidative after-treating of the black seemingly occurs due to contact of the black with the excess tangential air introduced along the longitudinal axis of the reactor as the black moves from the central portion of the reactor to either end in order to leave the reactor.

It will be evident that various modifications can be made to the method and apparatus of this invention. Such modifications, however, are considered as being within the scope of the invention.

What is claimed is:

1. A carbon black reactor comprising:
   a. a tubular chamber having a first and second end closed by a first and a second wall,
   b. first conduit means for feeding hydrocarbon feed along the axis of the reactor into said reactor proximate the first end of said chamber,
   c. second conduit means comprising a plurality of conduits opening tangentially into said chamber at a plurality of loci positioned along the longitudinal axis of said chamber and substantially equally spaced over the entire length of said chamber,
   d. third conduit means for introducing fuel into said reactor, the fuel outlet of said means being located approximately in the center between the two ends of said chamber for discharge of fuel in about equal amounts towards both ends of said chamber,
   e. fourth means for withdrawal of carbon black-containing gas from said reactor, said fourth means being located proximate to the locus of said first conduit means,
   f. fifth conduit means for introducing hydrocarbon feed or oxidant into said chamber along its longitudinal axis, said fifth conduit means being arranged proximate to the second end of said chamber, and
   g. sixth means for withdrawal of carbon black-containing gas from said reactor, said sixth means being located proximate to the locus of said fifth conduit means.

2. A carbon black reactor in accordance with claim 1 wherein said first conduit means is surrounded by a seventh conduit means for cooling said first conduit means and introducing oxidant axially into said chamber.

3. A carbon black reactor in accordance with claim 1 wherein a first insulating wall is located spaced from said first end of said chamber to form an open section between said first wall and said first insulating wall, passageways for the passage of carbon black-containing gas through these passageways being provided through said first insulating wall.

4. A carbon black reactor in accordance with claim 3 wherein a second insulation wall is located spaced apart from second end of said reactor to form an open section between second wall and said second insulation wall, passageways being provided in said second insulation wall for the passage of carbon black-containing smoke therethrough.

5. A carbon black reactor in accordance with claim 3 wherein eighth conduit means for tangential withdrawal of carbon black-containing gas from said open section are connected with said carbon black reactor.

* * * * *